(12) United States Patent
Curtis

(10) Patent No.: US 8,216,106 B2
(45) Date of Patent: Jul. 10, 2012

(54) LOCKING DIFFERENTIAL SIDE GEAR TO FRICTION DISC UNLOADING

(75) Inventor: Kent M. Curtis, Battle Creek, MI (US)

(73) Assignee: Eaton Corporation, Cleveland, OH (US)

( * ) Notice: Subject to any disclaimer, the term of this patent is extended or adjusted under 35 U.S.C. 154(b) by 503 days.

(21) Appl. No.: 12/474,417

(22) Filed: May 29, 2009

(65) Prior Publication Data
US 2010/0304916 A1 Dec. 2, 2010

(51) Int. Cl.
*F16H 48/20* (2006.01)
(52) U.S. Cl. ........................ 475/235; 475/240
(58) Field of Classification Search .................. 475/231, 475/232, 234, 235, 240; 192/93 A, 70.23, 192/70.28
See application file for complete search history.

(56) References Cited

U.S. PATENT DOCUMENTS

| | | | | |
|---|---|---|---|---|
| 3,831,462 A | * | 8/1974 | Baremor | 475/87 |
| 3,886,813 A | | 6/1975 | Baremor | |
| 3,893,351 A | | 7/1975 | Baremor | |
| 4,245,525 A | * | 1/1981 | LeBegue | 475/235 |
| 4,474,080 A | * | 10/1984 | Day | 475/235 |
| 4,876,921 A | * | 10/1989 | Yasui et al. | 475/86 |
| 5,472,385 A | | 12/1995 | Vu | |
| 6,688,194 B2 | | 2/2004 | Dissett et al. | |
| 2003/0040390 A1 | * | 2/2003 | Forrest et al. | 475/150 |
| 2003/0121750 A1 | | 7/2003 | Teraoka | |
| 2003/0199359 A1 | | 10/2003 | Tucker-Peake | |
| 2007/0191173 A1 | * | 8/2007 | Kyle et al. | 475/231 |
| 2008/0058151 A1 | * | 3/2008 | Curtis | 475/232 |
| 2009/0019966 A1 | | 1/2009 | Valente | |
| 2010/0267512 A1 | * | 10/2010 | Curtis | 475/231 |

FOREIGN PATENT DOCUMENTS
FR 1236945 A 7/1960

OTHER PUBLICATIONS

European Patent Office, International Search Report and Written Opinion issued in corresponding PCT Application PCT/IB2010/001248. Date of Mailing: Sep. 14, 2010.

* cited by examiner

*Primary Examiner* — Justin Holmes
*Assistant Examiner* — Huan Le
(74) *Attorney, Agent, or Firm* — Dykema Gossett PLLC

(57) ABSTRACT

A differential is provided that includes a case, a cam side gear disposed proximate a first end of the case, and a side gear disposed proximate a second end of the case. The side gears have respective hubs. The differential further includes a first clutch pack disposed around the hub of the side gear. The differential further includes an annular engaging member disposed between the side gear and the case.

18 Claims, 2 Drawing Sheets

LOCKING DIFFERENTIAL SIDE GEAR TO FRICTION DISC UNLOADING

TECHNICAL FIELD

The present invention relates to a locking differential, including a locking differential with a means for unloading the disc pack from the side gear to reduce and/or eliminate disc noise (i.e., chatter) from the disc pack while the differential is in an unlocked mode or condition.

BACKGROUND

One type of differential gear mechanism may commonly be referred to as a "locking differential." In particular, one type of locking differential may be referred to as a "mechanical locker" (i.e., a locking differential in which the locking function occurs in response to the operation of a mechanical device, as opposed to hydraulic actuation or electromagnetic actuation). The mechanical locker may include a disc pack (e.g., clutch pack) at first and second opposing ends of a differential case. Disc noise (e.g., chatter) may be caused by the disc pack at one or both ends of the differential case while the disc pack is in the unlocked mode. For example, disc noise may be caused by the disc pack at the bell end of the differential case. It may be desirable to include a structure or means for unloading the disc pack of the locking differential from the side gear while the differential is in the unlocked mode in order to reduce and/or eliminate the potential for chatter.

SUMMARY

A differential includes a case, a cam side gear disposed proximate a first end of the case, and a side gear disposed proximate a second end of the case. The side gears have respective hubs. The differential further includes a first clutch pack disposed around the hub of the side gear. The differential further includes an annular engaging member disposed between the side gear and the case.

A differential with a structure or means for unloading the disc pack in the unlocked mode in accordance with the present invention may reduce and/or eliminate disc noise (e.g., chatter) from the bell-end disc pack of a locking differential while in the unlocked mode. The means for unloading the disc pack may comprise an annular engaging member in accordance with an embodiment of the invention.

BRIEF DESCRIPTION OF THE DRAWINGS

Embodiments of the invention will now be described, by way of example, with reference to the accompanying drawings, wherein.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as embodied by the appended claims.

Figure 1:
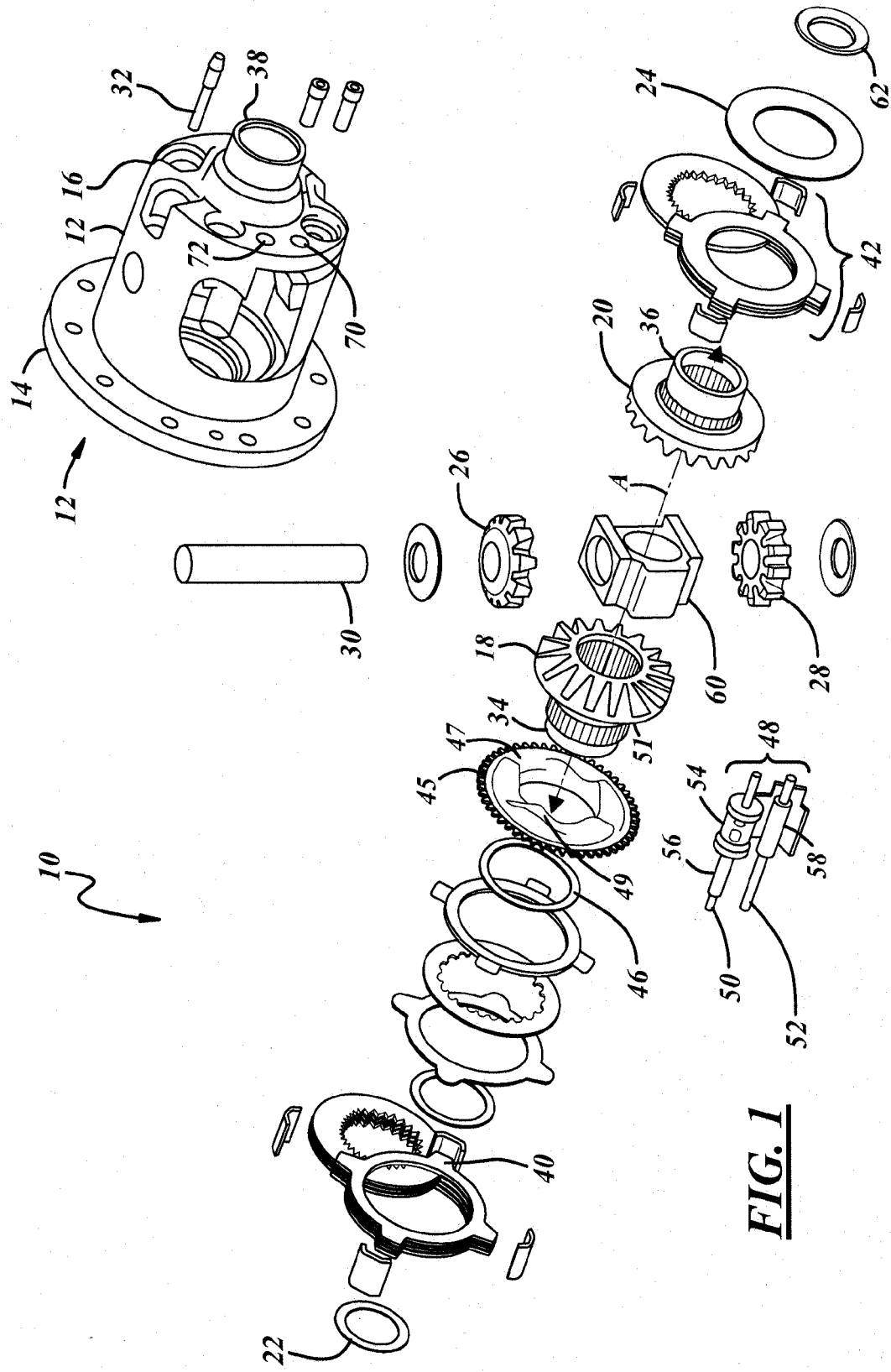
FIG. 1 is an exploded view of a mechanical locking differential in accordance with teachings or aspects of the present invention.

FIG. 1 is an exploded view of a mechanical locking differential 10. Differential 10 is configured to allow two wheels on a motor vehicle to operate at different speeds and maintain free differential action. However, if one wheel begins to slip, the drive axle may be automatically and fully locked side to side, thereby providing full power to both wheels. Differential 10 includes a case 12. Case 12 may include a first end 14 (e.g., flange end 14) and a second opposing end 16 (e.g., bell end 16). Case 12 may be configured to define a gear chamber and house various other components of differential 10. Torque input to differential 10 may be by means of an input gear (e.g., ring gear) (not shown). The input gear may be attached to case 12 by any means conventional in the art, including, but not limited to a plurality of bolts. The input gear may be in toothed engagement with an input pinion gear (not shown), which receives input drive torque from the vehicle driveline.

Differential 10 may further include a differential gear set disposed within the gear chamber of case 12. In particular, differential 10 may include cam side gear 18, side gear 20, thrust shims 22, 24, two pinion gears 26, 28, a pinion shaft (e.g., cross-shaft) 30, and a pinion shaft lock screw 32. The pinions gears 26, 28 may be rotatably mounted on the pinion shaft 30. The pinion shaft 30 may be connected to case 12 by various means conventional in the art. The pinion gears 26, 28 may comprise the input gears of the differential gear set disposed within the gear chamber of case 12. The pinion gears 26, 28 may be in meshing engagement with side gears 18, 20.

The side gears 18, 20 may comprise the output gears of the differential gear set disposed within the gear chamber of case 12. The side gears 18, 20 may each include an annular hub portion 34, 36. The annular hub portions 34, 36 of the side gears 18, 20 may be configured to receive a pair of axle shafts (not shown) of a motor vehicle, for example. An inner radial surface of the annular hub portions 34, 36 of the side gears 18, 20 may be splined. Accordingly, the side gears 18, 20 may be in splined engagement with the pair of axle shafts. Case 12 may include annular hub portions 38 on opposing ends of case 12 that are configured to surround the axle shafts. Typically, bearing sets (not shown) are mounted on the hub portions 38 to provide rotational support for the differential gear mechanism. Thrust shims 22, 24 may be provided to adjust proper side gear 18, 20 to pinion gear 26, 28 backlash during assembly.

During normal, straight-ahead operation of the vehicle, there may be limited differentiating action (e.g., substantially no differentiating action) that may occur between the left and right axle shafts, and the pinion gears 26, 28 may not rotate relative to the pinion shaft 30. Accordingly, the case 12, the pinion gears 26, 28, the side gears 18, 20, and the axle shafts may all rotate about an axis of rotation (A) of the axle shafts, generally in the form of an integral unit. Under certain operating conditions, such as when the vehicle is turning, a certain amount of differentiating action may occur between the side gears 18, 20, up to a predetermined level of difference in rotational speed. Above that predetermined level (e.g., above a difference of about 100 RPM between the side gears 18, 20), it may be desirable to retard the relative rotation between each of the side gears 18, 20 and the gear case 12, to help reduce or prevent excessive differentiating action between the axle shafts.

To retard differentiating action between the axle shafts, the differential 10 may be provided with a lockup means for locking up the differential gear set, and an actuating means for actuating the lockup means. For example, the lockup means may comprise clutch packs 40, 42. Clutch pack 40 may comprise a flange end clutch pack 40 and may be located at the flange end 14 of case 12. Clutch pack 42 may comprise a bell end clutch pack 42 and may be located at the bell end 16 of case 12. The clutch pack 40 may include a plurality of inner clutch discs and a plurality of outer clutch discs. In an embodiment, the inner clutch discs may include radially outwardly extending "ears." The "ears" may fit into guide holes in the differential case 12. Accordingly, the inner clutch discs may turn with the case 12. In an embodiment, the outer clutch discs may include splines (e.g., include teeth on the inner radial surface of each of the plurality of outer clutch discs). The splines on the outer clutch discs may be configured for engagement with the external splines of the side gears 18, 20. Accordingly, the outer clutch discs may turn with the axle shafts and/or wheels.

The lockup means may further include a clutch cam plate 44 and a wave spring 46. As is known is the art, the clutch cam plate 44 may be configured to affect movement of the clutch pack 40 from a disengaged condition to an engaged (e.g., "loaded") condition. In the engaged (e.g., "loaded") condition, the clutch pack 40 may be effective to retard relative rotation between the case 12 and the cam side gear 18, thus retarding and/or minimizing differentiating action between the side gears 18, 20. The clutch cam plate 44 may include a set of external teeth 45 on a radially outwardly extending outer surface. The clutch cam plate 44 may also include a cam surface 47 with a plurality of cam ramps 49. Cam side gear 18 may also define a cam surface 51 with a plurality of cam ramps (e.g., formations) and a plurality of detents (e.g., indentations) provided (e.g., machined) into the cam surface 51. In an embodiment, the cam surface 51 of cam side gear 18 may comprise the backside of the cam side gear 18 (i.e., the side facing the clutch cam plate 44). The cam ramps on cam side gear 18 may correspond with the cam ramps 49 on clutch cam plate 44. The mating detents on the cam side gear 18 may prevent the clutch cam plate 44 from ramping until a predetermined torque is applied at the external teeth 45 of the clutch cam plate 44. Accordingly, during normal, straight-ahead operation of the vehicle (e.g., with little or no differentiating action occurring), the cam surface of the cam side gear 18 and the cam surface 47 of the clutch cam plate 44 generally remain in a neutral position (i.e., no ramping) with the clutch cam plate 44 rotating with the cam side gear 18 at approximately the same rotational speed. By retarding rotation of the cam clutch plate 44 (e.g., by application of torque to the external teeth 45 of the clutch cam plate 44) relative to the cam side gear 18, movement of the clutch pack 40 may be achieved by virtue of the "ramping" of the cam surface of the cam side gear 18 and the cam surface 47 of the clutch cam plate 44. When the clutch cam plate 44 rotates out of the detents on cam side gear 18, the cam ramps 49 on the clutch cam plate 44 may engage the cam ramps on the backside of cam side gear 18. As the clutch cam plate 44 continues rotating, it moves axially toward the cam side gear 18 and applies pressure to the clutch pack 40.

Wave spring 46 is configured to apply pressure to the clutch cam plate 44 in order to help bias and/or maintain the clutch cam plate 44 in the detent position (i.e., so that the cam ramps 49 on the clutch cam plate 44 and backside of cam side gear 18 are not engaged). The axial pressure from the axial movement of the clutch cam plate 44 may be configured to be sufficiently strong to move the clutch cam plate 44 against the pressure applied by the wave spring 46.

In some embodiments, actuator 48 for actuating the lockup means may be utilized to retard rotation of the clutch cam plate 44 relative to the cam side gear 18. For example, the actuator 48 may comprise an engagement mechanism 50 and a lock-out mechanism 52. The engagement mechanism 50 may include a differential governor. The engagement mechanism 50 may be mounted within the case 12 for rotation about its own axis. The engagement mechanism 50 may include a plurality (e.g., two) spring loaded flyweights 54. The flyweights 54 may comprise cylindrical flyweights. The engagement mechanism 50 may further include an externally geared portion 56, which may be configured to engage the external teeth 45 of the clutch cam plate 44. The flyweights 54 may be rotatable about an axis that is oriented generally parallel to the axis of rotation (A). The flyweights 54 may each include a stop surface that is movable from a retracted position to an extended position in response to a predetermined extent of differentiating action. The flyweights 54 may also define a pivot axis generally parallel to and spaced apart from the axis around which the flyweights 54 are rotatable. In an embodiment, the stop surfaces of the flyweights 54 may be generally oppositely disposed from the pivot axis. The lock-out mechanism 52 of the actuator 48 may comprise a latching bracket. The lock-out mechanism 52 (e.g., latching bracket) may include a pawl 58.

During operation, if the differentiating action begins to occur between the axle shafts (e.g., there is a speed differential between the two wheels), the cam side gear 18 and clutch cam plate 44 may begin to rotate in unison at a speed different than that of the case 12, thereby causing the engagement mechanism 50 to begin to rotate about its axis. As the speed of the rotation of the engagement mechanism 50 increases, centrifugal force may cause the flyweights 54 to move outward. When the speed differential between the wheels is at or above a certain RPM (e.g., about 100 RPM), there may be sufficient centrifugal force on the flyweights 54 of the engagement mechanism 50 to overcome a centering spring and open (e.g., move out). The flyweights 54 may, for example, move outwardly until one of the stop surfaces of the flyweights 54 engages pawl 58 on the lock-out mechanism 52 (e.g., latching bracket), preventing further rotation of the engagement mechanism 50. When the engagement mechanism 50 stops rotating, the engagement of the geared portion 56 and the external teeth 45 on the clutch cam plate 44 may cause the clutch cam plate 44 to rotate at the same speed as the case 12 (which is different than the speeds of rotation of the cam side gear 18), resulting in ramping, and initializing engagement of the clutch pack 40. In other words, the stopped flyweight 54 may cause the geared portion 56 to rotate the clutch cam plate 44 out of its detent position, thereby triggering the ramping action and lock-up. When the clutch cam plate 44 is ramped against the cam side gear 18, the ramping increases until both axles turn at the same speed (e.g., full lock), which may prevent further wheel slip. In an embodiment, the differential 10 may unlock at speeds below about 20 mph (e.g., 32 kph) when a slight torque reversal is sensed at under 100 RPM differentiation (e.g., when the vehicle is going straight and there is substantially equal traction side-to-side or there is a slight turning (i.e., differentiating) in the direction opposite the original lock).

Differential 10 may further include a reaction block or thrust block 60. Reaction block 60 may be configured to provide an axial link between the cam side gear 18 as it ramps and begins to move axially toward the opposing side gear 20 (i.e., the side gear opposing cam side gear 18), to apply clutching pressure to the clutch pack 42 located at the bell end 16 of the differential case 12. Force from cam side gear 18 may be transferred through the reaction block 60 to side gear 20, which transfers the force to the clutch pack 42 (i.e., bell-end clutch pack 42). Similarly, force from a side gear 20 may be transferred through the reaction block 60 to the cam side gear 18, which transfers the force to the clutch pack 40 (i.e., flange-end clutch pack 40). Accordingly, both side gears 18, 20 may be fully locked to the differential case 12, which may lock both axle shafts and their corresponding wheels and tires together to provide increased or maximum traction. The reaction block 60 may be disposed within case 12 and may include one or more apertures to receive the pinion shaft 30.

The differential 10 may further include a means for unloading the bell-end clutch pack 42 from the side gear 20 while the differential 10 is in an unlocked mode or condition. Means 62 may, for example, comprise an annular engaging member. Annular engaging member 62 may be configured to keep the bell-end disc pack 42 unloaded until the axial force of the cam side gear 18 to reaction block 60 to side gear 20 overcomes the force of the annular engaging member 62. Annular engaging member 62 may, if desired, function as a spring. Annular engaging member 62 may be configured to keep the side gear 20 lifted axially off the bell-end clutch pack 42 in the unlocked mode, thereby preventing inadvertent clutching action of the bell-end clutch pack 42 and potential associated slip-stick disc noise (e.g., chatter).

Figure 2:
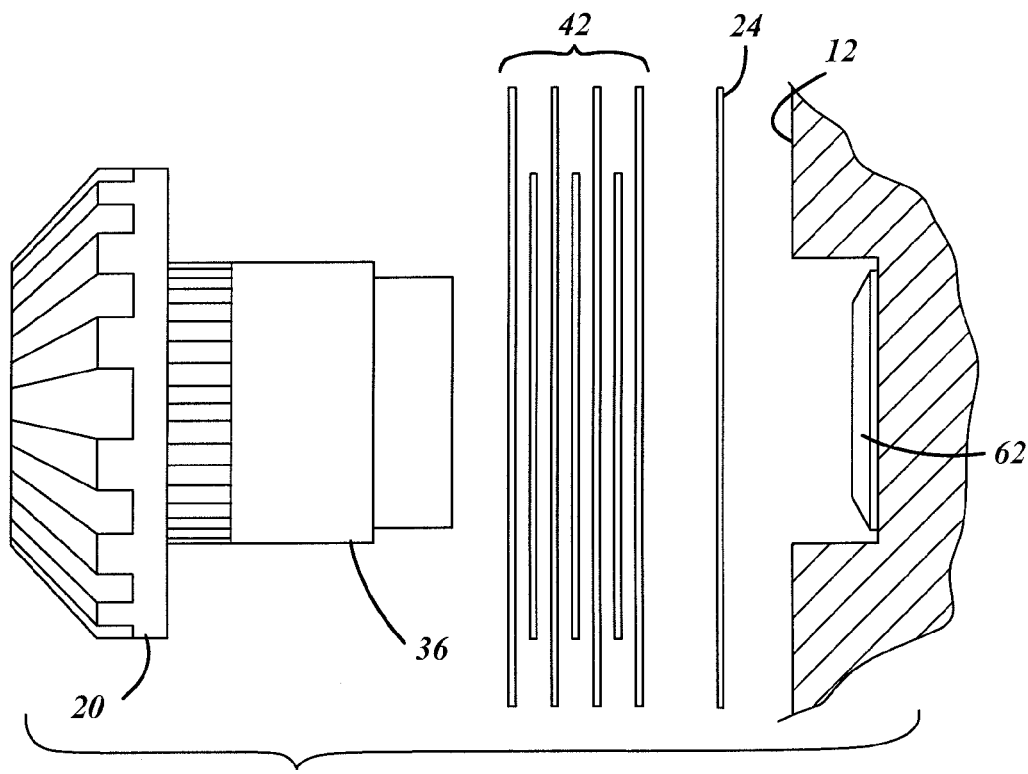
FIG. 2 is a schematic of a portion of a mechanical locking differential in accordance with an embodiment of the present invention.

Referring now to FIG. 2, annular engaging member 62 may be located adjacent the side gear hub 36 (i.e., between the side gear hub 36 and case 12). The annular engaging member 62 may have a first side that is in direct contact with the side gear hub 36 of the side gear 20. The annular engaging member 62 may have a second side (i.e., opposing the first side) that is in direct contact with the case 12. When the axial force of the cam side gear 18 to reaction block 60 to side gear 20 overcomes the force of the annular engaging member 62, this axial force may allow movement of the side gear 20 and thus, the clutching of the bell-end disc pack 42. In an embodiment, annular engaging member 62 may be a non-flat washer with a slight substantially conical shape (i.e., a spring washer and/or a cupped spring washer). For example, means 62 may comprise a Belleville washer. Although there are other types of springs that may be utilized, the Belleville washer is believed to provide the best combination of spring strength, limited axial motion from relaxed to compressed condition, and efficient use of space for the particular application in a differential.

Figure 3:
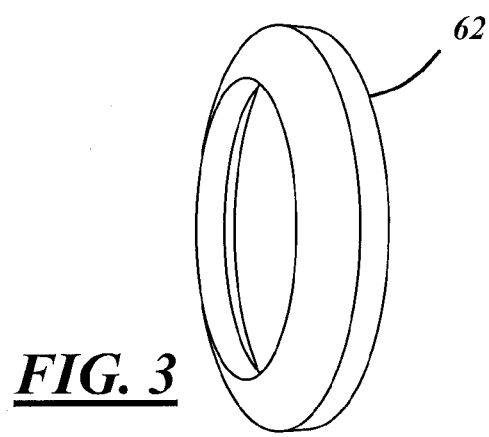
FIG. 3 is a perspective view of an annular engaging member of the type shown in connection with the mechanical locking differential of FIG. 1.
Figure 4:
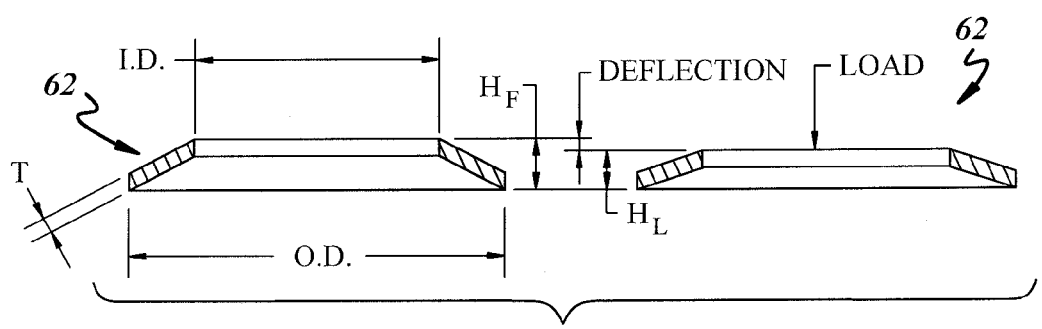
FIG. 4 is a cross-sectional view of the annular engaging member of FIG. 3 generally illustrated in an unloaded and loaded condition.

Referring to FIGS. 3-4, annular engaging member 62 may have an outer diameter O.D. that is about the same as the outer diameter of hub 36 of side gear 20. Annular engaging member 62 may have an inner diameter I.D. that is about the same as the inner diameter of hub 36 of side gear 20. The inner diameter of hub 36 of side gear 20 may be configured to allow passage of a corresponding axle shaft (not shown). Annular engaging member 62 may have a thickness T that is commensurate with a predetermined spring resistance or lifting force for a particular differential size application. Although these measurements for the outer and inner diameters and thickness are mentioned, annular engaging members with various outer and inner diameter measurements and/or various thicknesses may be used in accordance with the present invention and may depend on the size of the differential and its various components.

Referring now to FIG. 4, annular engaging member 62 may have a height $H_F$ that is about equal to the midrange between the fully compressed and fully relaxed state when the annular engaging member 62 is in an unloaded condition (e.g., the side gear 20 is not providing sufficient axial force to overcome the force of the annular engaging member 62). In an unloaded condition, the annular engaging member 62 may provide at least some spring tension to push side gear 20 toward reaction block 60 when the differential 10 is in an unlocked mode. The annular engaging member 62 may thereby ensure help to ensure that the discs of clutch pack 42 associated with side gear 20 are completely and/or substantially completely unloaded until overcome by axial locking action. However, the annular engaging member 62 can be configured so it does not push side gear 20 toward reaction block 60 so far that the side gear 20 is out of mesh with pinion gears 26, 28 and/or beyond the clearance of reaction block 60 (i.e., whichever is closer). The annular engaging member 62 may have a height $H_L$ that is about equal to the fully compressed state when the annular engaging member 62 is in a loaded condition (e.g., the side gear 20 is providing sufficient axial force to overcome the force of the annular engaging member 62). Although the heights $H_F$ and $H_L$ are mentioned in detail, annular engaging members with various heights in unloaded and loaded conditions may be used in accordance with the present invention. Annular engaging member 62 may provide a large amount of force with relatively little axial movement.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims. It is intended that the scope of the invention be defined by the claims appended hereto and their equivalents.

What is claimed:

1. A differential comprising:
   a case;
   a cam side gear disposed proximate a first end of the case, wherein the cam side gear has a cam side gear hub having an outer diameter that is smaller than an outer diameter of a remainder of the cam side gear, the cam side gear hub having a first axial end facing at least a portion of the case;
   a side gear disposed proximate a second end of the case, wherein the side gear has a side gear hub having an outer diameter that is smaller than an outer diameter of a remainder of the side gear, the side gear hub having a first axial end facing at least a portion of the case;
   a first clutch pack disposed around an outer radial surface of the side gear hub; and
   an annular engaging member disposed between the first axial end of the side gear hub and the case, wherein the annular engaging member comprises a cupped washer.

2. The differential of claim 1, wherein the annular engaging member is in direct contact with the first axial end of the side gear hub and is in direct contact with the case.

3. The differential of claim 1, wherein the differential is a mechanical locking differential.

4. The differential of claim 1, wherein the differential further comprises:
- an engagement mechanism configured to have at least a portion of the engagement mechanism that is moveable from a retracted position to an extended position; and
- a lock-out mechanism configured to engage the portion of the engagement mechanism.

5. The differential of claim 1, further comprising a reaction block disposed between the cam side gear and the side gear, wherein the reaction block is configured to transfer force between the cam side gear and the side gear.

6. The differential of claim 1, wherein the annular engaging member comprises a spring washer.

7. The differential of claim 1, wherein the annular engaging member comprises a Belleville spring.

8. The differential of claim 1, wherein the annular engaging member has a substantially conical shape.

9. The differential of claim 1, wherein the annular engaging member has an outer diameter that is substantially the same as the outer diameter of the side gear hub and wherein the annular engaging member has an inner diameter that is substantially the same as an inner diameter of the side gear hub.

10. The differential of claim 1, further comprising a second clutch pack disposed proximate a first end of the case.

11. The differential of claim 10, further comprising a clutch cam plate disposed between the cam side gear and the second clutch pack.

12. The differential of claim 11, wherein the clutch cam plate includes a set of external teeth on a radially outward surface and includes a cam surface with a plurality of cam ramps.

13. The differential of claim 12, wherein the cam side gear includes a cam surface that corresponds to the plurality of cam ramps on the clutch cam plate.

14. A differential comprising:
- a case;
- a cam side gear disposed proximate a first end of the case, wherein the cam side gear has a cam side gear hub having an outer diameter that is smaller than an outer diameter of a remainder of the cam side gear, the cam side gear hub having a first axial end facing at least a portion of the case;
- a side gear disposed proximate a second end of the case, wherein the side gear has a side gear hub having an outer diameter that is smaller than an outer diameter of a remainder of the side gear, the side gear hub having a first axial end facing at least a portion of the case;
- a first clutch pack disposed around an outer radial surface of the side gear hub; and
- a means for unloading the first clutch pack from the side gear, wherein the means is disposed between the first axial end of the side gear hub and the case.

15. The differential of claim 14, wherein the means is configured to lift the side gear off the first clutch pack.

16. A differential comprising:
- a case;
- at least one pinion gear disposed in the case;
- a cam side gear disposed in the case and in meshed engagement with the at least one pinion gear, wherein the cam side gear has a cam side gear hub having an outer diameter that is smaller than an outer diameter of a remainder of the cam side gear, the cam side gear hub having a first axial end facing at least a portion of the case;
- a side gear disposed in the case and in meshed engagement with the at least one pinion gear, wherein the side gear has a side gear hub having an outer diameter that is smaller than an outer diameter of a remainder of the side gear, the side gear hub having a first axial end facing at least a portion of the case;
- a first lockup means operable to retard differential action of the differential;
- an actuating means for actuating the first lockup means;
- a reaction block disposed in the case between the cam side gear and the side gear;
- a second lockup means operable to retard differential action of the differential; and
- an annular engaging member disposed between the first axial end of the side gear hub and the case, wherein the annular engaging member comprises a cupped washer.

17. The differential of claim 16, further comprising an input gear connected to the case.

18. The differential of claim 16, wherein the cam side gear and the side gear are in splined engagement with a pair of axle shafts.

* * * * *